US009794685B2

(12) United States Patent
Aiba (10) Patent No.: US 9,794,685 B2
(45) Date of Patent: Oct. 17, 2017

(54) VIDEO AUDIO RECORDING SYSTEM, VIDEO AUDIO RECORDING DEVICE, AND VIDEO AUDIO RECORDING METHOD

(71) Applicant: Akihito Aiba, Kanagawa (JP)

(72) Inventor: Akihito Aiba, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 3 days.

(21) Appl. No.: 14/984,728

(22) Filed: Dec. 30, 2015

(65) Prior Publication Data

US 2016/0219246 A1    Jul. 28, 2016

(30) Foreign Application Priority Data

Jan. 23, 2015 (JP) ................................ 2015-011515
Nov. 19, 2015 (JP) ................................ 2015-226788

(51) Int. Cl.
| | | |
|---|---|---|
| H04N 5/92 | (2006.01) |
| H04R 1/40 | (2006.01) |
| H04N 5/77 | (2006.01) |
| H04N 9/802 | (2006.01) |
| H04N 9/82 | (2006.01) |
| H04R 1/34 | (2006.01) |
| H04R 3/00 | (2006.01) |

(52) U.S. Cl.
CPC .............. *H04R 1/403* (2013.01); *H04N 5/77* (2013.01); *H04N 9/802* (2013.01); *H04N 9/8211* (2013.01); *H04R 1/342* (2013.01); *H04R 3/00* (2013.01); *H04R 2201/025* (2013.01)

(58) Field of Classification Search
CPC ...... H04N 9/8042; H04N 5/85; G11B 27/105; G11B 27/034; G11B 27/329
USPC .......................................................... 386/338
See application file for complete search history.

(56) References Cited

U.S. PATENT DOCUMENTS

| | | | | |
|---|---|---|---|---|
| 2006/0268663 A1* | 11/2006 | Bitton | ................... | G01S 3/8083 367/127 |
| 2009/0132161 A1* | 5/2009 | Akita | ................. | G01C 21/3647 701/532 |
| 2014/0139611 A1 | 5/2014 | Aiba | | |

FOREIGN PATENT DOCUMENTS

| | | |
|---|---|---|
| JP | 11-341592 | 12/1999 |
| JP | 2008-271082 | 11/2008 |
| JP | 2011-041096 | 2/2011 |
| JP | 2014-510430 | 4/2014 |
| JP | 2014-176042 | 9/2014 |
| WO | WO2012/097314 A1 | 7/2012 |

* cited by examiner

*Primary Examiner* — William C Vaughn, Jr.
*Assistant Examiner* — Daniele Tekle
(74) *Attorney, Agent, or Firm* — Oblon, McClelland, Maier & Neustadt, L.L.P.

(57) ABSTRACT

A video audio recording system includes a video acquisition unit, an audio acquisition unit, a video recording parameter acquisition unit, and an audio emphasis unit. The video acquisition unit acquires a video signal by recording video of a subject. The audio acquisition unit acquires an audio signal by recording a sound. The video recording parameter acquisition unit acquires first information representing a video recording direction of the video acquisition unit and second information representing a positional relationship between the video acquisition unit and the audio acquisition unit. The audio emphasis unit emphasizes, based on the acquired first and second information, the acquired audio signal of the sound arriving in a predetermined direction.

15 Claims, 8 Drawing Sheets

VIDEO AUDIO RECORDING SYSTEM, VIDEO AUDIO RECORDING DEVICE, AND VIDEO AUDIO RECORDING METHOD

CROSS-REFERENCE TO RELATED APPLICATION

This patent application is based on and claims priority pursuant to 35 U.S.C. §119(a) to Japanese Patent Application No. 2015-011515 filed on Jan. 23, 2015, in the Japan Patent Office, and Japanese Patent Application No. 2015-226788 filed on Nov. 19, 2015, in the Japan Patent Office, the entire disclosures of which are hereby incorporated by reference herein.

BACKGROUND

Technical Field

This disclosure relates to a video audio recording system, a video audio recording device, and a video audio recording method to record video and sound.

Related Art

Some devices, such as a video camera, a smartphone (high-performance mobile phone), a tablet terminal, and a videoconferencing device, are equipped with a camera and a microphone to have a function of concurrently acquiring a video signal and an audio signal with the camera and the microphone, respectively.

To prevent the microphone from collecting unnecessary sounds unrelated to a subject video-recorded with the camera, a mobile terminal, for example, may include the camera to acquire the video signal, the microphone to acquire the audio signal, an estimation unit to estimate the relative position of the subject to the mobile terminal based on the position of the subject in the video signal acquired with the camera and parameter information (e.g., information of the angle of field and the focal length) used in the video recording by the camera, and an adjustment unit to adjust the directivity of the microphone to the relative position of the subject.

SUMMARY

In one embodiment of this disclosure, there is provided an improved video audio recording system that includes, for example, a video acquisition unit, an audio acquisition unit, a video recording parameter acquisition unit, and an audio emphasis unit. The video acquisition unit acquires a video signal by recording video of a subject. The audio acquisition unit acquires an audio signal by recording a sound. The video recording parameter acquisition unit acquires first information representing a video recording direction of the video acquisition unit and second information representing a positional relationship between the video acquisition unit and the audio acquisition unit. The audio emphasis unit emphasizes, based on the acquired first and second information, the acquired audio signal of the sound arriving in a predetermined direction.

In one embodiment of this disclosure, there is provided an improved video audio recording device connected to a video acquisition unit to acquire a video signal by recording video of a subject and an audio acquisition unit to acquire an audio signal by recording a sound. The video audio recording device includes, for example, first circuitry and second circuitry. The first circuitry acquires first information representing a video recording direction of the video acquisition unit and second information representing a positional relationship between the video acquisition unit and the audio acquisition unit. The second circuitry emphasizes, based on the acquired first and second information, the acquired audio signal of the sound arriving in a predetermined direction.

In one embodiment of this disclosure, there is provided an improved video audio recording method that includes, for example, acquiring a video signal by recording video of a subject, acquiring an audio signal by recording a sound, acquiring first information representing a direction of recording the video and second information representing a relationship between a position of recording the video and a position of recording the sound, and emphasizing, based on the acquired first and second information, the acquired audio signal of the sound arriving in a predetermined direction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict example embodiments of this disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same function, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Referring now to the drawings, wherein like reference numerals designate identical or corresponding parts throughout the several views, an embodiment of this disclosure will be described in detail.

A video audio recording system according to the embodiment will now be described.

Figure 1:
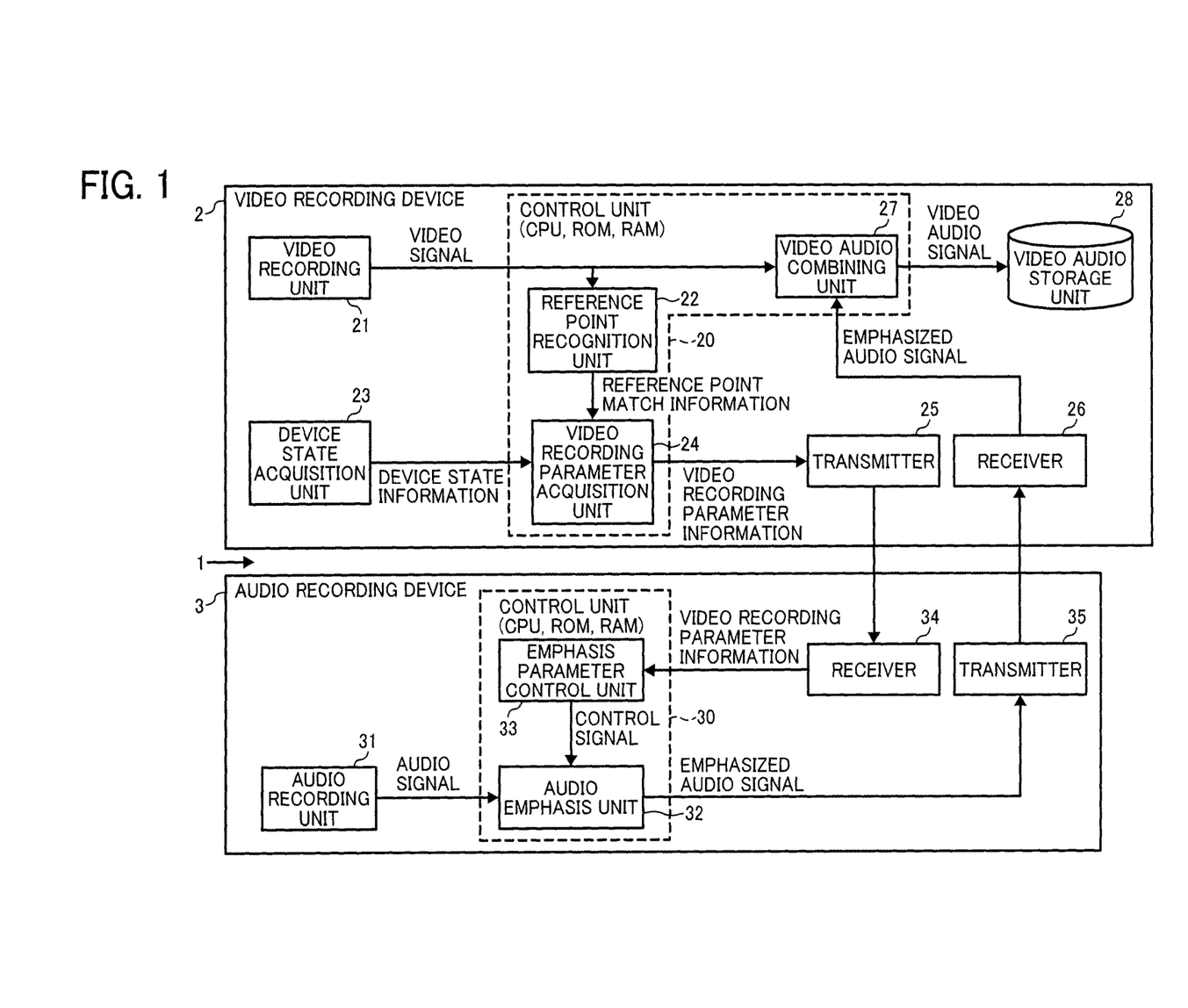
FIG. 1 is a block diagram illustrating a configuration of a video audio recording system according to an embodiment of this disclosure.

FIG. 1 is a block diagram illustrating a configuration of a video audio recording system 1 according to the embodiment. As illustrated in FIG. 1, the video audio recording system 1 according to the embodiment includes a video recording device 2 and an audio recording device 3.

The video recording device 2 records video of a subject and acquires a video signal. The audio recording device 3 records a sound and acquires an audio signal, which is an electrical signal corresponding to the sound. Further, the video recording device 2 combines the video signal acquired thereby and the audio signal acquired by the audio recording device 3 to generate a video audio signal, and stores the generated video audio signal.

The audio recording device 3 not only generates the audio signal by recording a voice, i.e., a sound uttered by a human being, but also generates an electrical signal corresponding to any ambient sound, such as a sound or noise from an object or an operating sound of machinery. That is, the audio recording device 3 records all sounds including voices and generates audio signals, i.e., electrical signals corresponding to the sounds.

The video recording device 2 includes a video recording unit 21, a reference point recognition unit 22, a device state acquisition unit 23, a video recording parameter acquisition unit 24, a transmitter 25, a receiver 26, a video audio combining unit 27, and a video audio storage unit 28. Herein, the reference point recognition unit 22, the video recording parameter acquisition unit 24, and the video audio combining unit 27 are formed of a control unit 20, which is a general-purpose computer including a central processing unit (CPU), a read-only memory (ROM), and a random access memory (RAM). That is, the reference point recognition unit 22, the video recording parameter acquisition unit 24, and the video audio combining unit 27 are functional blocks implemented as the CPU processes, in the RAM serving as a work area, a computer program such as a video audio recording program stored in the ROM.

The audio recording device 3 includes an audio recording unit 31, an audio emphasis unit 32, an emphasis parameter control unit 33, a receiver 34, and a transmitter 35. Herein, the audio emphasis unit 32 and the emphasis parameter control unit 33 are formed of a control unit 30, which is a general-purpose computer including a CPU, a ROM, and a RAM. That is, the audio emphasis unit 32 and the emphasis parameter control unit 33 are functional blocks implemented as the CPU processes, in the RAM serving as a work area, a computer program such as a video audio recording program stored in the ROM.

The video recording device 2 will now be described.

In the video recording device 2, the video recording unit 21, which is a camera, for example, records video of a subject and acquires a video signal.

The reference point recognition unit 22 sets the video recording device 2 and the audio recording device 3 to have a predetermined positional relationship (hereinafter referred to as the initial positional relationship) prior to the acquisition of the video signal and the audio signal by the video audio recording system 1.

More specifically, the reference point recognition unit 22 determines whether or not a reference point representing a position of the audio recording device 3 in the image formed by the video signal is located at a predetermined position, and outputs the determination result as reference point match information. The coordinates of the reference point representing the position of the audio recording device 3 in the image formed by the video signal will hereinafter be referred to as the image coordinates. The reference point match information is set to "true" if the image coordinates of the audio recording device 3 is located at the predetermined position, and is set to "false" if the image coordinates of the audio recording device 3 is not located at the predetermined position. The reference point recognition unit 22 employs a method such as pattern matching, for example, in the determination, as described in detail later with reference to FIGS. 3A to 3C. Further, the reference point recognition unit 22 may use multiple reference points. In this case, the reference point recognition unit 22 determines whether or not each of the reference points is located at the corresponding predetermined position (i.e., predetermined coordinates).

The device state acquisition unit 23 acquires device state information, which includes the rate of acceleration and the rate of angular acceleration of the video recording device 2, for example. For instance, when $a_X$, $a_Y$, and $\omega_Z$ represent the rate of acceleration in the X-axis direction, the rate of acceleration in the Y-axis direction, and the rate of angular acceleration about the Z-axis, respectively, in an XYZ orthogonal coordinate system set in three-dimensional space, the device state information may be represented by a set ($a_X$, $a_Y$, $\omega_Z$) of the three values $a_X$, $a_Y$, and $\omega_Z$. Herein, a plane including the X-axis and the Y-axis is a horizontal plane, and the Z-axis is a vertical line perpendicular to the horizontal plane. The rates of acceleration and the rate of angular acceleration may be acquired with an acceleration sensor and an angular acceleration sensor, for example. That is, the device state acquisition unit 23 may be implemented by an acceleration sensor and an angular acceleration sensor, for example.

The video recording parameter acquisition unit 24 acquires video recording parameter information of the video recording device 2. For example, when the position and the video recording direction of the video recording device 2 set to have the above-described initial positional relationship with the audio recording device 3 are referred to as an origin (i.e., a reference value of information representing the positional relationship) and a reference video recording direction of 0 degrees (i.e., a reference value of information representing the video recording direction), respectively, the video recording parameter information represents the current coordinates (i.e., the information representing the positional relationship) of the video recording device 2 relative to the origin and the current angle (i.e., the information representing the video recording direction) of the video recording device 2 relative to reference video recording direction.

For example, the video recording parameter information may be represented by a set (X, Y, θ) of three values X, Y, and θ estimated from the device state information output from the device state acquisition unit 23 and the reference point match information output from the reference point recognition unit 22. That is, when Δt represents the time interval between the acquisition of the device state information and $(X_0, Y_0, \theta_0)$ represents the video recording parameter information estimated last time, the current video recording parameter information is calculated from the following equations 1 to 3.

$$X = X_0 + a_X \Delta t^2 \quad (1)$$

$$Y = Y_0 + a_Y \Delta t^2 \quad (2)$$

$$Z = \theta_0 + \omega_Z \Delta t^2 \quad (3)$$

In equations 1 to 3, $a_X \Delta t^2$, $a_Y \Delta t^2$ and $\omega_Z \Delta t^2$ represent the double integrals on the time axis of the rate of acceleration $a_X$, the rate of acceleration $a_Y$, and the rate of angular acceleration $\omega_Z$, respectively.

Herein, the estimation of the video recording parameter information may be started with the initial video recording parameter information $(X_0, Y_0, \theta_0) = (0, 0, 0)$, i.e., a reference state in which the reference point match information is "true" and the device state information $(a_X, a_Y, \omega_Z)$ is (0, 0, 0) indicating that the video recording device 2 is stationary. In this case, the double integrals on the time axis of the device state information $(a_X, a_Y, \omega_Z)$ are calculated from the reference state, to thereby acquire the video recording parameter information representing the current position and the current video recording direction of the video recording device 2.

Figure 2A:
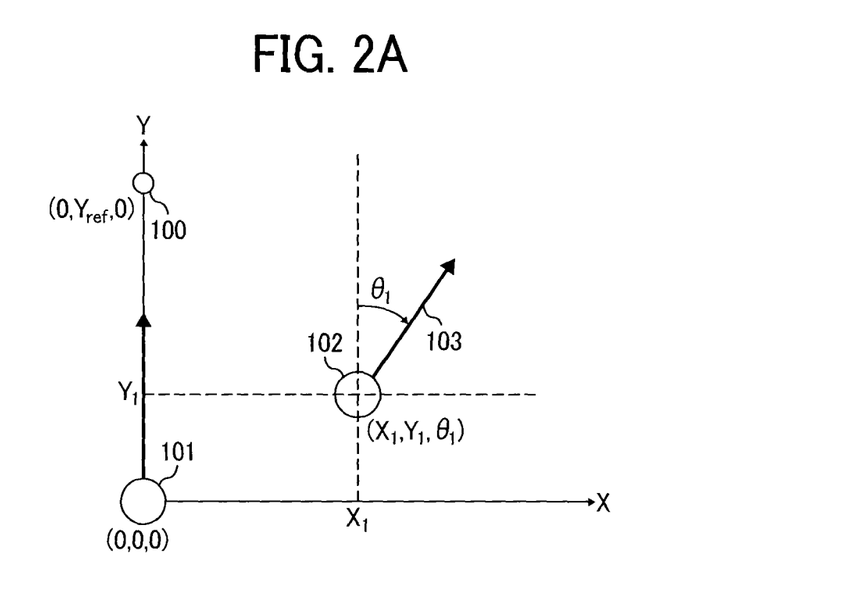
FIGS. 2A and 2B are diagrams illustrating the relationship between video recording parameter information and device state information in the video audio recording system according to the embodiment.
Figure 2B:
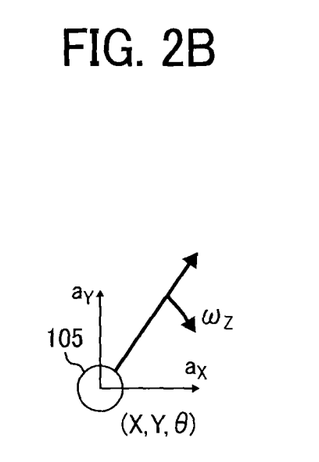

FIGS. 2A and 2B are diagrams illustrating the relationship between the video recording parameter information and the device state information. FIG. 2A illustrates the video recording parameter information. FIG. 2B illustrates the device state information.

In FIG. 2A, a point 101 corresponding to (X, Y, θ)=(0, 0, 0) represents the video recording parameter information of the video recording device 2 having the initial positional relationship with the audio recording device 3. A point 102 corresponding to (X, Y, θ)=$(X_1, Y_1, \theta_1)$ represents the current video recording parameter information of the video recording device 2. An arrow 103 represents the current video recording direction $(\theta_1)$ of the video recording device 2. A point 100 corresponding to (X, Y, θ)=(0, $Y_{ref}$, 0) represents the video recording parameter information of the video recording device 2 relative to the audio recording device 3 in the initial positional relationship. That is, in the initial positional relationship, the audio recording device 3 is separated from the video recording device 2 by a distance of $Y_{ref}$ in the Y-axis direction indicated by an arrow 104.

In FIG. 2B, the respective directions of the rate of acceleration $a_X$ in the X-axis direction, the rate of acceleration $a_Y$ in the Y-axis direction, and the rate of angular acceleration $\omega_Z$ about the Z-axis at a given point 105 (X, Y, θ) are indicated by the respective corresponding arrows.

Returning to FIG. 1, the transmitter 25 transmits the video recording parameter information to the audio recording device 3. The communication method employed in this transmission may be wired or wireless communication. The receiver 26 receives the audio signal recorded and emphasized by the audio recording device 3 (hereinafter referred to as the emphasized audio signal). The communication method employed in this reception may also be wired or wireless communication.

The video audio combining unit 27 combines the video signal acquired by the video recording unit 21 and the emphasized audio signal received by the receiver 26 to generate the video audio signal in which the video signal and the emphasized audio signal are associated with each other. The video audio storage unit 28, which is implemented by a hard disk, a solid state disk (SSD), or a secure digital (SD) memory card, for example, stores the video audio signal.

The audio recording device 3 will now be described.

The audio recording unit 31, which is implemented by a microphone array, for example, records a sound and generates an audio signal. The audio emphasis unit 32 generates from the audio signal an emphasized audio signal in which a sound arriving from a given direction is emphasized. For example, beam forming with a microphone array or switching between microphones with different directivity patterns may be employed as a method of emphasizing the sound. The beam forming with a microphone array will be described in detail later.

The receiver 34 receives the video recording parameter information from the video recording device 2. The emphasis parameter control unit 33 controls later-described audio emphasis parameters of the audio emphasis unit 32 based on the video recording parameter information received by the receiver 34. The transmitter 35 transmits the emphasized audio signal generated by the audio emphasis unit 32 to the video recording device 2.

In the present embodiment, the video recording device 2 includes the video audio storage unit 28 to receive the audio signal from the audio recording device 3. However, the configuration of the embodiment may be modified to include the video audio storage unit 28 in the audio recording device 3 to receive the video signal from the video recording device 2. Further, the video audio storage unit 28 may be included in another device.

Further, although the video audio signal is stored in the present embodiment, the video audio signal may be output from an additionally provided output unit, such as a display or a speaker, for example, or may be transmitted to another device via a network for videoconferencing or any other purpose.

Further, in the present embodiment, the device state acquisition unit 23 is included in the video recording device 2 on the assumption that the video recording device 2 is movable while the audio recording device 3 is stationary after it is determined that the audio recording device 3 and the video recording device 2 have the initial positional relationship. However, the audio recording device 3 may also include a device state acquisition unit to acquire the device state information of the audio recording device 3. This configuration allows the video recording device 2 to acquire the video recording parameter information even if the audio recording device 3 moves.

The acquisition of the reference state of the video recording parameter information will now be described.

Figure 3A:
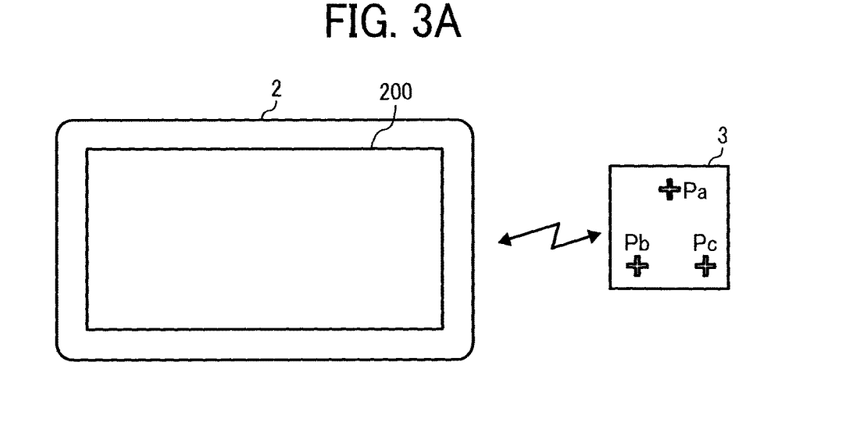
FIGS. 3A, 3B, and 3C are diagrams illustrating an example procedure of an operation of adjusting the position and direction of a video recording device relative to an audio recording device in the video audio recording system according to the embodiment.
Figure 3B:
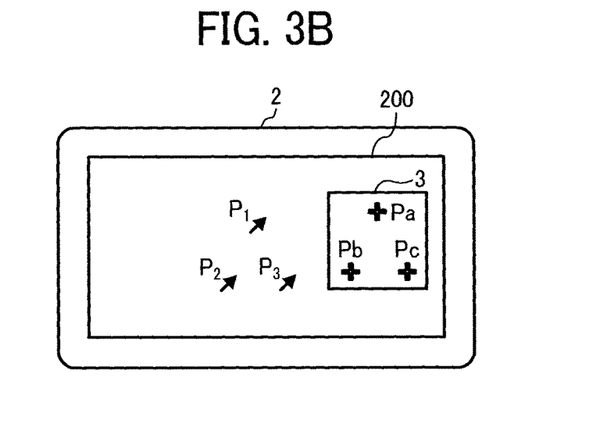
Figure 3C:
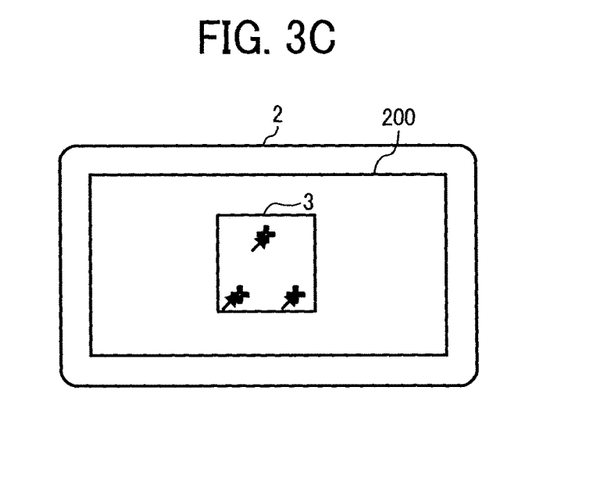

With reference to FIGS. 3A, 3B, and 3C, a description will be given of an example procedure of an operation of adjusting the position and direction of the video recording device 2 relative to the audio recording device 3. As illustrated in FIG. 3A, in the present example, the video recording device 2 is a tablet terminal equipped with a camera, and the audio recording device 3 is a wireless microphone wirelessly communicable with the video recording device 2.

The adjustment operation is executed under the following first to third conditions: three points in the audio recording device 3 are set as reference points, the image coordinates obtained by recording video of the three points with the video recording device 2 at a predetermined position in a predetermined direction are represented as (xa, ya), (xb, yb), and (xc, yc), and the audio recording device 3 is stationary during the recording of the video. As illustrated in FIG. 3A, in the present example, the respective centers of three cross marks Pa, Pb, and Pc in the audio recording device 3 are set as the reference points.

For example, while viewing the image of the audio recording device 3 being recorded, a user moves the video recording device 2 such that the respective centers of the three cross marks Pa, Pb, and Pc serving as the reference points match coordinates $(x_1, y_1)$, $(x_2, y_2)$, and $(x_3, y_3)$, respectively. In this process, it is preferable to display guides on the coordinates $(x_1, y_1)$, $(x_2, y_2)$, and $(x_3, y_3)$ in the image being recorded to allow the user to check the result. As illustrated in FIG. 3B, in the present example, the video recording device 2 includes a display 200 to display arrows $P_1$, $P_2$, and $P_3$ indicating the coordinates $(x_1, y_1)$, $(x_2, y_2)$, and $(x_3, y_3)$, respectively.

If the respective coordinates of the three reference points in the image being recorded match the coordinates $(x_1, y_1)$, $(x_2, y_2)$, and $(x_3, y_3)$, as illustrated in FIG. 3C, as a result of moving the video recording device 2, the reference point recognition device 22 outputs the reference point match information set to "true."

Further, the device state acquisition unit 23 acquires the rates of acceleration and the rate of angular acceleration of the video recording device 2 from the acceleration sensor and the angular acceleration sensor, and outputs the device state information. If the video recording device 2 is stationary, the device state information is represented as (0, 0, 0).

The video recording parameter acquisition unit 24 receives the reference point match information set to "true" and the device state information represented as (0, 0, 0), and sets the state at this point of time as the reference state for calculating the coordinates and the angle. That is, the video recording parameter acquisition unit 24 sets the video recording parameter information (X, Y, θ) to (0, 0, 0). Thereby, the adjustment operation is completed.

Figure 4:
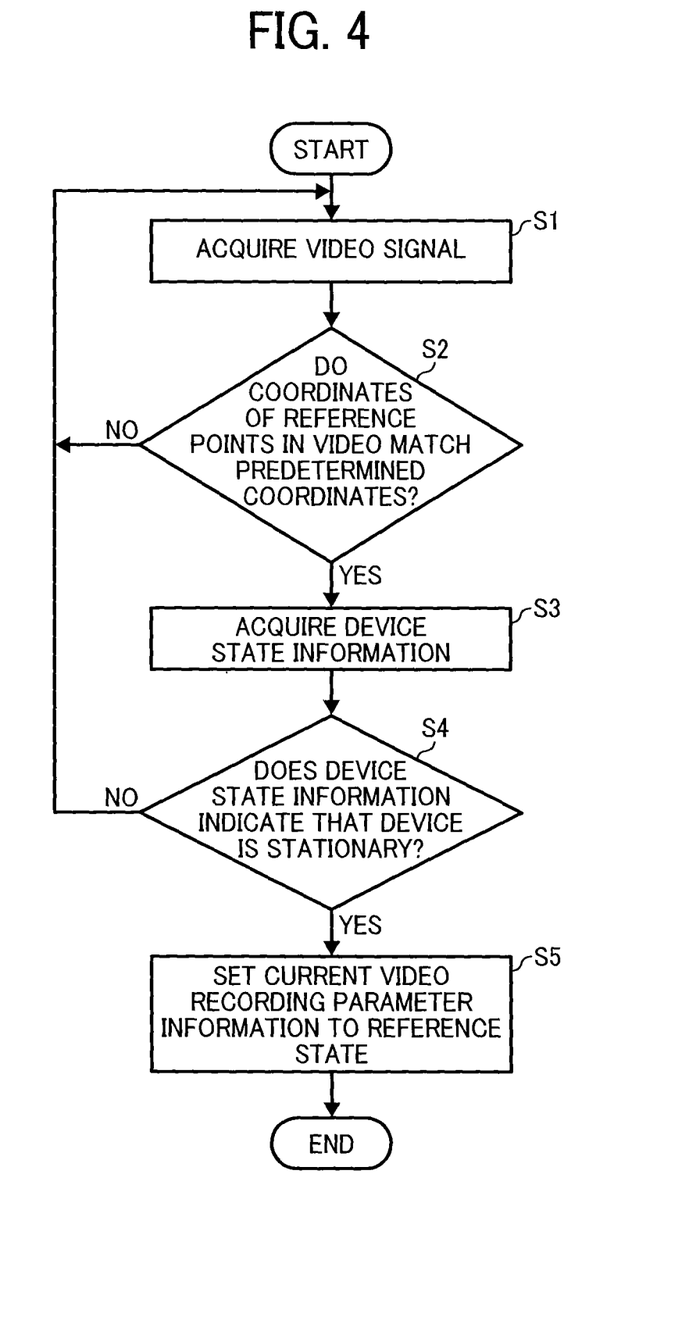
FIG. 4 is a flowchart illustrating a procedure of a process of acquiring a reference state of the video recording parameter information performed by the video audio recording system according to the embodiment.

FIG. 4 is a flowchart illustrating a procedure of a process of acquiring the reference state of the video recording parameter information performed by the video audio recording system 1.

The video recording unit 21 first acquires the video signal (step S1). Then, the reference point recognition unit 22 determines whether or not the image coordinates of the reference points in the video formed by the acquired video signal (e.g., the image coordinates (xa, ya), (xb, yb), and (xc, yc) at the centers of the cross marks Pa, Pb, and Pc in FIG. 3B) match the predetermined coordinates (e.g., the coordinates $(x_1, y_1)$, $(x_2, y_2)$, and $(x_3, y_3)$) (step S2). If it is determined that the image coordinates of the reference points match the predetermined coordinates (YES at step S2), the procedure proceeds to step S3. If it is not determined that the image coordinates of the reference points match the predetermined coordinates (NO at step S2), the procedure returns to step S1.

At step S3, the device state acquisition unit 23 acquires the device state information $(a_X, a_Y, \omega_Z)$. Then, the video recording parameter acquisition unit 24 determines whether or not the device state information $(a_X, a_Y, \omega_Z)$ indicates that the video recording device 2 is stationary, i.e., whether or not the device state information $(a_X, a_Y, \omega_Z)$ is (0, 0, 0) (step S4). If it is determined that the device state information $(a_X, a_Y, \omega_Z)$ indicates that the video recording device 2 is stationary (YES at step S4), the procedure proceeds to step S5. If it is not determined that the device state information $(a_X, a_Y, \omega_Z)$ indicates that the video recording device 2 is stationary (NO at step S4), the procedure returns to step S1.

At step S5, the video recording parameter acquisition unit 24 sets the current video recording parameter information to the reference state. That is, when the device state information $(a_X, a_Y, \omega_Z)$ is (0, 0, 0), the video recording parameter acquisition unit 24 sets $(X_0, Y_0, \theta_0)=(0, 0, 0)$ as the video recording parameter information (X, Y, θ) of the video recording device 2. Consequently, the video recording parameter information at the point 101 in FIG. 2A is set when, for example, the respective centers of the cross marks Pa, Pb, and Pc match the respective tips of the arrows $P_1$, $P_2$, and $P_3$ in FIG. 3B and the video recording device 2 is stationary.

The relationship between the video recording direction of the video recording device 2 and the directivity of the audio recording device 3 will now be described.

Figure 5A:
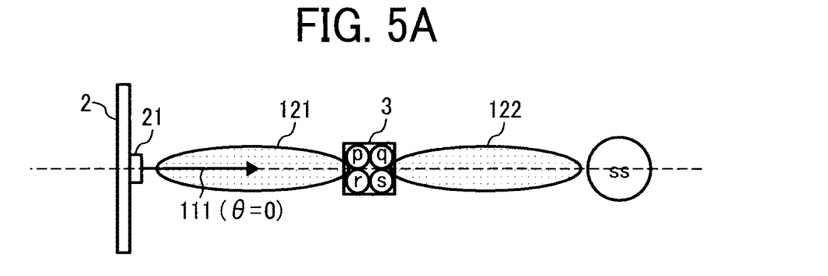
FIGS. 5A, 5B, and 5C are diagrams illustrating the relationship between the video recording direction of the video recording device and the directivity of the audio recording device in the embodiment.
Figure 5B:
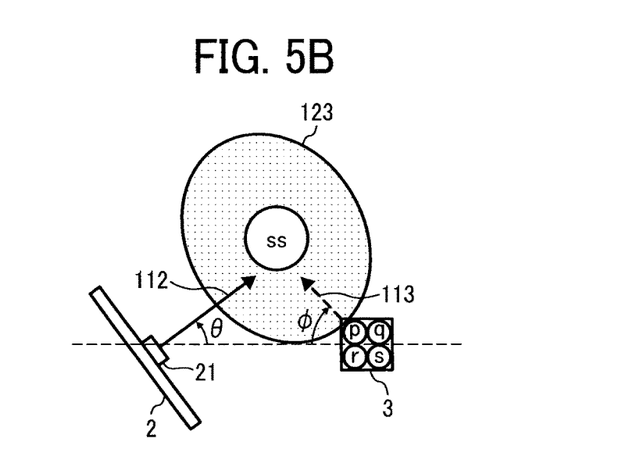
Figure 5C:
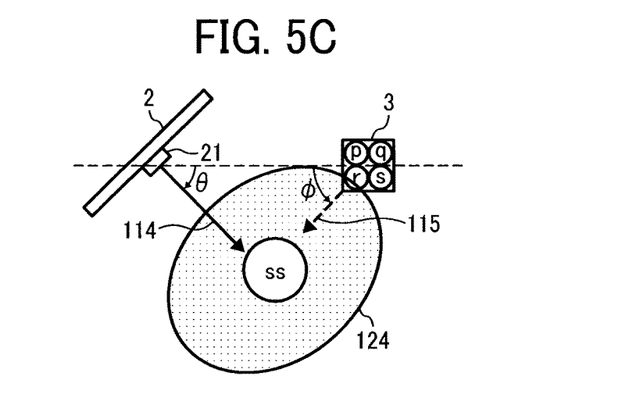

FIGS. 5A, 5B, and 5C are diagrams illustrating the relationship between the video recording direction of the video recording device 2 and the directivity of the audio recording device 3 in the video audio recording system 1. In FIGS. 5A to 5C, p, q, r, and s represent microphones forming the audio recording unit 31. The four microphones p, q, r, and s are arranged at the vertices of a square representing the audio recording device 3.

FIG. 5A illustrates a state in which the video recording direction of the video recording unit 21 corresponds to a direction 111 toward the audio recording device 3. In this state, the directivity of the audio recording device 3 has a dipole pattern with directivity 121 having a peak value in a direction toward the center of the video recording unit 21 and directivity 122 having a peak value in a direction opposite to the direction toward the center of the video recording unit 21.

FIG. 5B illustrates a state in which the video recording direction of the video recording unit 21 corresponds to a direction 112 rotated counterclockwise by θ degrees from the direction toward the audio recording device 3. In this state, the directivity of the audio recording device 3 has a monopole pattern with directivity 123 having a peak value in a direction 113 rotated clockwise by φ degrees from the direction toward the video recording unit 21.

FIG. 5C illustrates a state in which the video recording direction of the video recording unit 21 corresponds to a direction 114 rotated clockwise by θ degrees from the direction toward the audio recording device 3. In this state, the directivity of the audio recording device 3 has a monopole pattern with directivity 124 having a peak value in a direction 115 rotated counterclockwise by φ degrees from the direction toward the video recording unit 21.

As illustrated in FIGS. 5A to 5C, it is normally assumed that a target sound source SS is located in the direction 111, 112, or 114 corresponding to the video recording direction of the video recording device 2. With the audio recording device 3 set to the directivity 122, 123, or 124, therefore, a sound from the sound source SS is emphasized. To realize the above-described directivity patterns, the emphasis parameter control unit 33 of the audio recording device 3 outputs a control signal to the audio emphasis unit 32, and the audio emphasis unit 32 forms directivity based on the control signal. Herein, the control signal indicates the type (i.e., monopole or dipole) of directivity formed in accordance with the value of θ indicating video recording direction information and the value of φ indicating the direction of directivity.

TABLE 1 given below illustrates an example of a table representing the relationship between θ and φ. Herein, a direction of θ=0 corresponds to the direction 111 illustrated in FIG. 5A, i.e., the direction from the center of the video recording unit 21 toward the microphones p, q, r, and s of the audio recording device 3. When θ has a positive value, the direction of θ is rotated clockwise. When the θ is a negative value, the direction of θ is rotated counterclockwise. The value of θ is substantially −π/4 in FIG. 5B and substantially π/4 in FIG. 5C.

TABLE 1

| θ as video recording direction information | corresponding control signal |
| --- | --- |
| −π/6 < θ ≤ π/6 | dipole, φ = 0 |
| π/6 < θ ≤ 5π/6 | monopole, φ = −π/4 |
| 5π/6 < θ ≤ 7π/6 | monopole, φ = 0 |
| 7π/6 < θ ≤ 11π/6 | monopole, φ = π/4 |

Further, in TABLE 1, a direction of φ=0 corresponds to the direction from the audio recording device 3 toward the center of the video recording unit 21, i.e., a direction of θ=π. When φ has a positive value, the direction of φ is rotated clockwise. When φ has a negative value, the direction of φ is rotated counterclockwise.

As to the relationship between FIGS. 5A to 5C and TABLE 1, therefore, FIG. 5A corresponds to −π/6<θ≤π/6, dipole, and φ=0 in TABLE 1, FIG. 5B corresponds to 7π/6<θ≤11π/6, monopole, and φ=π/4 in TABLE 1, and FIG. 5C corresponds to π/6<θ≤5π/6, monopole, and φ=−π/4 in TABLE 1.

Herein, beam forming with a microphone array, for example, is employed as a method of emphasizing the audio signal. For example, when the directivity is formed in the direction of φ, the emphasized audio signal is obtained from the following equation 4 in delay-and-sum beam forming.

$$Y(\omega) = W^H(\omega) z(\omega) \quad (4)$$

Herein, ω represents the angular frequency of the spectrum of the audio signal, Y represents the spectrum of the emphasized audio signal, z represents the spectrum of the input audio signal, W represents a filter coefficient for emphasis, and H represents the complex conjugate transpose. The spectrum z and the filter coefficient W are expressed in vector, as in the following equations 5 and 6.

$$z(\omega) = [z_1(\omega), \ldots, z_M(\omega)]^T \quad (5)$$

$$W(\omega) = [W_1(\omega), \ldots, W_M(\omega)]^T \quad (6)$$

Herein, the subscript of z represents the identification number of each of microphones employed, M represents the number of the microphones, and T represents the transpose of a matrix.

If the respective positions of the microphones and the direction of the sound source corresponding to the audio signal intended to be emphasized are on the same plane, the value of the filter coefficient W is expressed by the following equation 7.

$$W_m(\omega) = \exp\{j(\omega/C)(x_m \sin \phi + y_m \cos \phi)\} \quad (7)$$

Herein, $W_m(W)$ represents the filter coefficient for emphasis when the coordinates of each of the microphones are $(x_m, y_m)$, and m represents the microphone. Further, C represents the acoustic velocity, and φ represents the direction of the sound source corresponding to the audio signal intended to be emphasized.

A description will now be given of a control of the directivity of the audio recording device 3 performed when a change occurs in the position of the video recording device 2 relative to the audio recording device 3.

Figure 6:
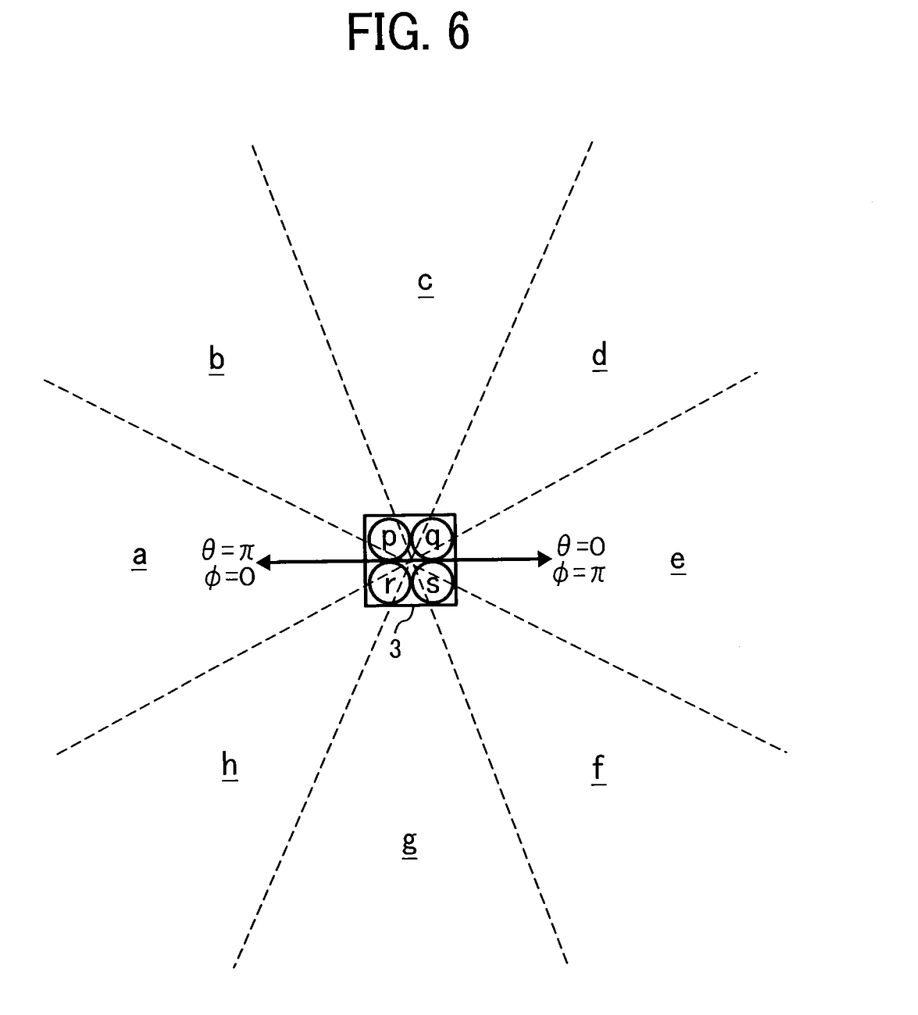
FIG. 6 is a diagram illustrating a control of the directivity of the audio recording device performed when a change occurs in the position of the video recording device relative to the audio recording device in the video audio recording system according to the embodiment.

FIG. 6 is a diagram illustrating the control of the directivity of the audio recording device 3 performed when a change occurs in the position of the video recording device 2 relative to the audio recording device 3. FIG. 6 illustrates areas a, b, c, d, e, f, g, and h obtained by dividing 360 degrees (i.e., 2π) by eight.

In this case, for example, the control signal is changed depending on in which of the eight areas a to h the video recording device 2 is located, as viewed from the audio recording device 3. For example, if the video recording device 2 is located in the area c, θ indicating the video recording direction and the control signal indicating the type and the direction φ of directivity are set as in TABLE 2 given below.

TABLE 2

| θ as video recording direction information | corresponding control signal |
| --- | --- |
| π/3 < θ ≤ π2/3 | dipole, φ = π/2 |
| π2/3 < θ ≤ 4π/3 | monopole, φ = π/4 |
| 4π/3 < θ ≤ 5π/3 | monopole, φ = π/2 |
| 5π/3 < θ, θ ≤ π/3 | monopole, φ = 3π/4 |

In TABLE 2, θ=0 corresponds to the direction from the audio recording device 3 toward the center of the area e. When θ has a positive value, the direction of θ is rotated clockwise. When θ has a negative value, the direction of θ is rotated counterclockwise. Further, φ=0 corresponds to the direction from the audio recording device 3 toward the center of the area a. When φ has a positive value, the direction of φ is rotated clockwise. When φ has a negative value, the direction of φ is rotated counterclockwise.

A table containing the above-described data of TABLE 2 is prepared for each of the areas a to h. Thereby, the directivity is appropriately formed regardless of a change in the direction of the video recording device 2 relative to the audio recording device 3. If the video recording device 2 is located in an area other than the area c (hereinafter referred to as the target area), the difference in angle between the area c and the target area is added to the values of the ranges of θ illustrated in TABLE 2.

Although the value of φ is changed in four stages in this example, the value of φ may be changed in more stages. For example, the value of φ may be changed continuously in accordance with the value of θ.

An operation of the video audio recording system 1 will now be described.

Figure 7:
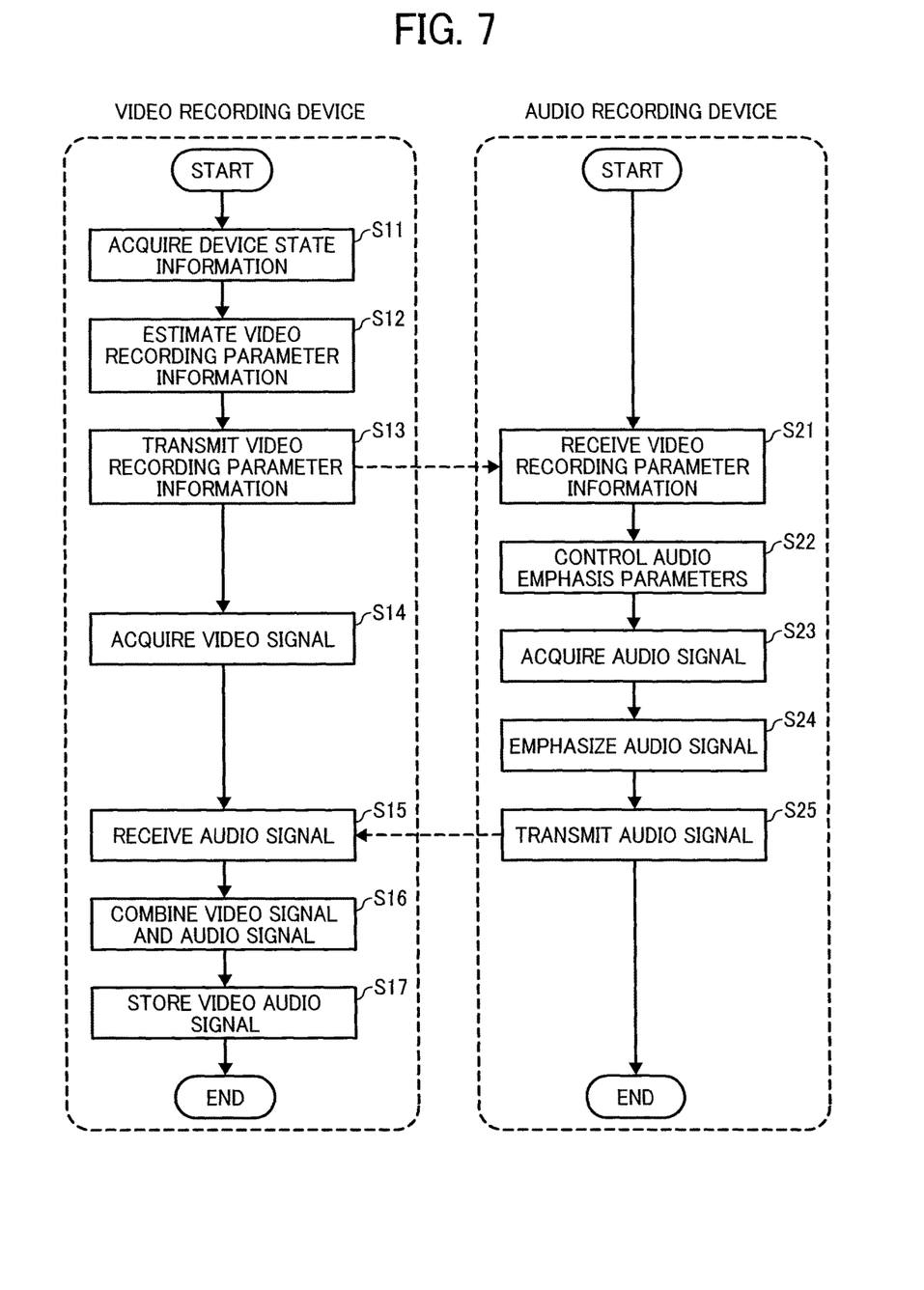
FIG. 7 is a flowchart illustrating an operation of the video audio recording system according to the embodiment.

FIG. 7 is a flowchart illustrating the operation of the video audio recording system 1. In the video recording device 2, the device state acquisition unit 23 first acquires the device state information (step S11). Then, the video recording parameter acquisition unit 24 estimates the video recording parameter information from the device state information acquired at step S11 (step S12). In this step, the reference state set in the process illustrated in FIG. 4 is used.

Then, the transmitter 25 transmits the video recording parameter information estimated at step S12 to the audio recording device 3 (step S13), and the video recording unit 21 acquires the video signal (step S14).

In the audio recording device 3, the receiver 34 receives the video recording parameter information (step S21). Then, the emphasis parameter control unit 33 controls the audio emphasis parameters in accordance with the video recording parameter information received at step S21 (step S22).

Then, the audio recording unit 31 acquires the audio signal (step S23), and the audio emphasis unit 32 emphasizes the audio signal acquired at step S23 based on the audio emphasis parameters controlled at step S22 to acquire the emphasized audio signal (step S24). Then, the transmitter 35 transmits the emphasized audio signal acquired at step S24 to the video recording device 2. Thereby, the process in the audio recording device 3 is completed.

In the video recording device 2, the receiver 26 receives the emphasized audio signal (step S15), and the video audio combining unit 27 combines the video signal acquired at step S14 and the emphasized audio signal received at step S15 to acquire the video audio signal (step S16). Then, the video audio storage unit 28 stores the video audio signal acquired at step S16 (step S17). Thereby, the process in the video recording device 2 is completed.

A computer system that implements the video recording device 2 and the audio recording device 3 will now be described.

Figure 8:
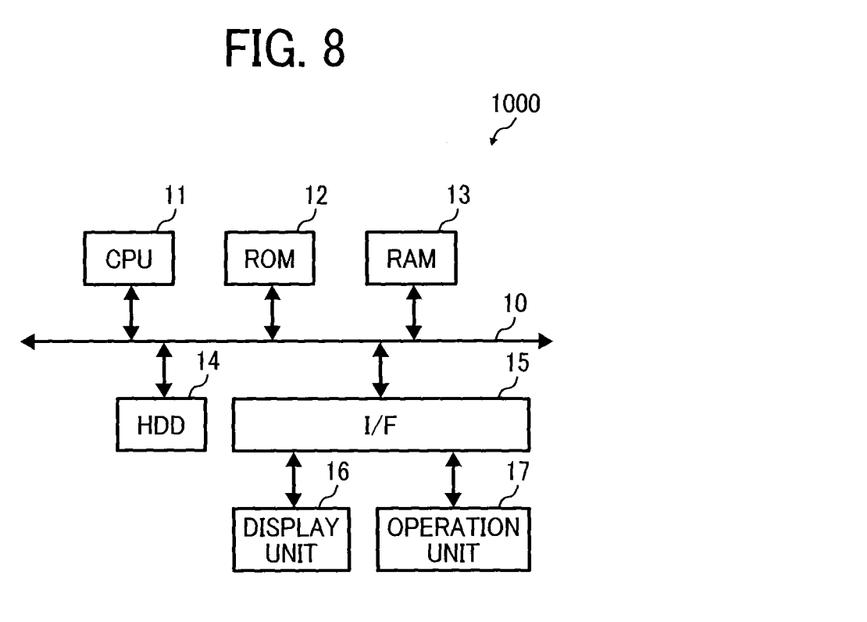
FIG. 8 is a block diagram illustrating a hardware configuration of a computer system that implements the video recording device and the audio recording device according to the embodiment.

FIG. 8 is a block diagram illustrating a hardware configuration of a computer system that implements the video recording device 2 and the audio recording device 3. The video recording device 2 and the audio recording device 3 may be implemented by a general-purpose computer system 1000 as illustrated in FIG. 8. The computer system 1000 includes a CPU 11, a ROM 12, a RAM 13, a hard disk drive (HDD) 14, and an interface (I/F) 15 connected to one another via a bus 10. The I/F 15 is connected to a display unit 16, such as a liquid crystal display (LCD), and an operation unit 17.

The CPU 11 is an arithmetic device that controls the operation of the entire computer system 1000. The ROM 12 is a read-only non-volatile storage medium that stores programs such as firmware. The RAM 13 is a volatile storage medium capable of reading and writing information at high speed and used as a work area in information processing by the CPU 11. The HDD 14 is a non-volatile storage medium capable of reading and writing information, and stores an operating system (OS), a variety of control programs, application programs, and so forth. The I/F 15 connects and controls the bus 10, a variety of hardware components, a network, and so forth. The display unit 16 is a visual user interface for allowing the status of the computer system 1000 to be visually checked. For example, the foregoing guides indicating the coordinates $(x_1, y_1)$, $(x_2, y_2)$, and $(x_3, y_3)$ may be displayed on the display unit 16 by the CPU 11. The operation unit 17, which includes a keyboard and a mouse, for example, is a user interface for allowing input of information to the computer system 1000.

As described above, the video audio recording system 1 according to the present embodiment estimates the position of the video recording unit 21 relative to the audio recording unit 31 and the video recording direction of the video recording unit 21, and identifies the direction of a sound arriving at the audio recording unit 31 and changes the directivity of the audio recording unit 31 in accordance with the estimation result. Even if a change occurs in the positional relationship between the audio recording unit 31 and the video recording unit 21, therefore, the audio signal is favorably acquired.

Further, the video audio recording system 1 according to the present embodiment does not emphasize, i.e., relatively reduces, a sound arriving from outside the range of video recording in accordance with the result of estimation of the video recording direction of the video recording unit 21. For example, the video audio recording system 1 may reduce a sound arriving from outside the range of video recording to be at least smaller than the sound arriving in a predetermined direction.

The video audio recording system 1 according to the present embodiment further estimates the position and the video recording direction of the video recording device 2 from the rate of acceleration and the rate of angular acceleration of the video recording device 2.

Further, the video audio recording system 1 according to the present embodiment uses the reference position of the video recording unit 21 relative to the audio recording unit 31 and the reference video recording direction of the video recording unit 21 in the estimation of the position and the video recording direction of the video recording unit 21.

The video audio recording system 1 according to the present embodiment further allows the reference position of the video recording unit 21 relative to the audio recording unit 31 and the reference video recording direction of the video recording unit 21 to be obtained during the use of the video audio recording system 1.

In the foregoing embodiment, the video recording device 2 and the audio recording device 3 are separate devices from each other, with the video recording unit 21 (e.g., camera) included in the video recording device 2 and the audio recording unit 31 (e.g., microphones) included in the audio recording device 3. Alternatively, the video recording device 2 and the audio recording device 3 may be integrated into one video audio recording device, with the video recording unit 21 and the audio recording unit 31 provided separately from the video audio recording device.

According to an embodiment of this disclosure, even if a change occurs in the relationship between a position of acquiring a video signal and a position of acquiring an audio signal when the video signal and the audio signal are acquired at the same time, the audio signal is acquired accurately. For example, the relationship between the two positions may change, if the video signal or the audio signal is exchanged between a device including the camera and a device including the microphone via wireless communication, and if the devices are carried and moved. A video audio recording system according to an embodiment of this disclosure acquires the audio signal accurately even in such a case.

Numerous additional modifications and variations are possible in light of the above teachings. For example, elements or features of different illustrative and embodiments herein may be combined with or substituted for each other within the scope of this disclosure and the appended claims. Further, features of components of the embodiments, such as number, position, and shape, are not limited to those of the disclosed embodiments and thus may be set as preferred. Further, the above-described steps are not limited to the order disclosed herein. It is therefore to be understood that, within the scope of the appended claims, this disclosure may be practiced otherwise than as specifically described herein.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

This disclosure can be implemented in any convenient form, for example using dedicated hardware, or a mixture of dedicated hardware and software. This disclosure may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since this disclosure can be implemented as software, each and every aspect of this disclosure thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus

What is claimed is:

1. A video audio recording system comprising:
    a video acquisition device configured to acquire a video signal by recording video of a subject;
    an audio acquisition device configured to acquire an audio signal by recording a sound;
    wherein the video acquisition device further includes processing circuitry configured to acquire first information representing a video recording direction of the video acquisition device and second information representing a positional relationship between the video acquisition device and the audio acquisition device; and
    the audio acquisition device further includes processing circuitry configured to receive the first and second information from the video acquisition device and to emphasize, based on the acquired first and second information, the acquired audio signal of the sound arriving in a predetermined direction.

2. The video audio recording system of claim 1, wherein the processing circuitry of the audio acquisition device does not emphasize an audio signal of a sound arriving from outside a range of recording the video estimated from the acquired first and second information.

3. The video audio recording system of claim 1, wherein the second information represents a position of the video acquisition device relative to a position of the audio acquisition device.

4. The video audio recording system of claim 1, wherein the processing circuitry of the video acquisition device is further configured to acquire third information representing a state of motion of the video acquisition device,
    wherein the processing circuitry of the video acquisition device acquires the second information with the acquired third information.

5. The video audio recording system of claim 4, wherein the third information represents a rate of acceleration and a rate of angular acceleration of the video acquisition device.

6. The video audio recording system of claim 4, wherein the processing circuitry of the video acquisition device is further configured to determine, based on the acquired video signal, whether coordinates of a predetermined reference point in a space match predetermined coordinates in an image corresponding to the acquired video signal,
    wherein when the processing circuitry of the video acquisition device determines that the coordinates of the predetermined reference point in the space match the predetermined coordinates in the image corresponding to the acquired video signal, and if the acquired third information indicates that the video acquisition device is stationary, the processing circuitry of the video acquisition device acquires a reference value of the first information and a reference value of the second information.

7. The video audio recording system of claim 6, further comprising a display configured to display a guide for adjustment of the position and direction of the video acquisition device until the processing circuitry of the video acquisition device acquires the reference value of the first information and the reference value of the second information.

8. A video audio recording device connected to a video acquisition device configured to acquire a video signal by recording video of a subject and an audio acquisition device configured to acquire an audio signal by recording a sound, the video audio recording device comprising:
    processing circuitry configured to:
        acquire first information representing a video recording direction of the video acquisition device and second information representing a positional relationship between the video acquisition device and the audio acquisition device; and
        emphasize, based on the acquired first and second information, the acquired audio signal of the sound arriving in a predetermined direction.

9. A video audio recording method comprising:
    acquiring a video signal by recording video of a subject;

acquiring an audio signal by recording a sound;

acquiring first information representing a direction of recording the video and second information representing a relationship between a position of recording the video and a position of recording the sound; and emphasizing, based on the acquired first and second information, the acquired audio signal of the sound arriving in a predetermined direction.

10. The video audio recording method of claim 9, further comprising:

estimating a range of recording the video from the acquired first and second information; and excluding an audio signal of a sound arriving from outside the range of recording the video from the emphasizing.

11. The video audio recording method of claim 9, wherein the acquiring the first and second information includes:

acquiring the position of recording the video relative to the position of recording the sound as the second information.

12. The video audio recording method of claim 9, further comprising:

acquiring third information representing a state of motion of the position of recording the video, wherein the acquiring the first and second information includes:

using the acquired third information to acquire the second information.

13. The video audio recording method of claim 12, wherein the acquiring the third information includes:

acquiring a rate of acceleration and a rate of angular acceleration of the position of recording the video.

14. The video audio recording method of claim 12, further comprising:

determining, based on the acquired video signal, whether coordinates of a predetermined reference point in a space match predetermined coordinates in an image corresponding to the acquired video signal; and acquiring a reference value of the first information and a reference value of the second information, if the coordinates of the predetermined reference point in the space are determined to match the predetermined coordinates in the image corresponding to the acquired video signal, and if the acquired third information indicates that the position of recording the video is stationary.

15. The video audio recording method of claim 14, further comprising:

displaying a guide for adjustment of the position and direction of recording the video until the reference value of the first information and the reference value of the second information are acquired.

* * * * *